UNITED STATES PATENT OFFICE.

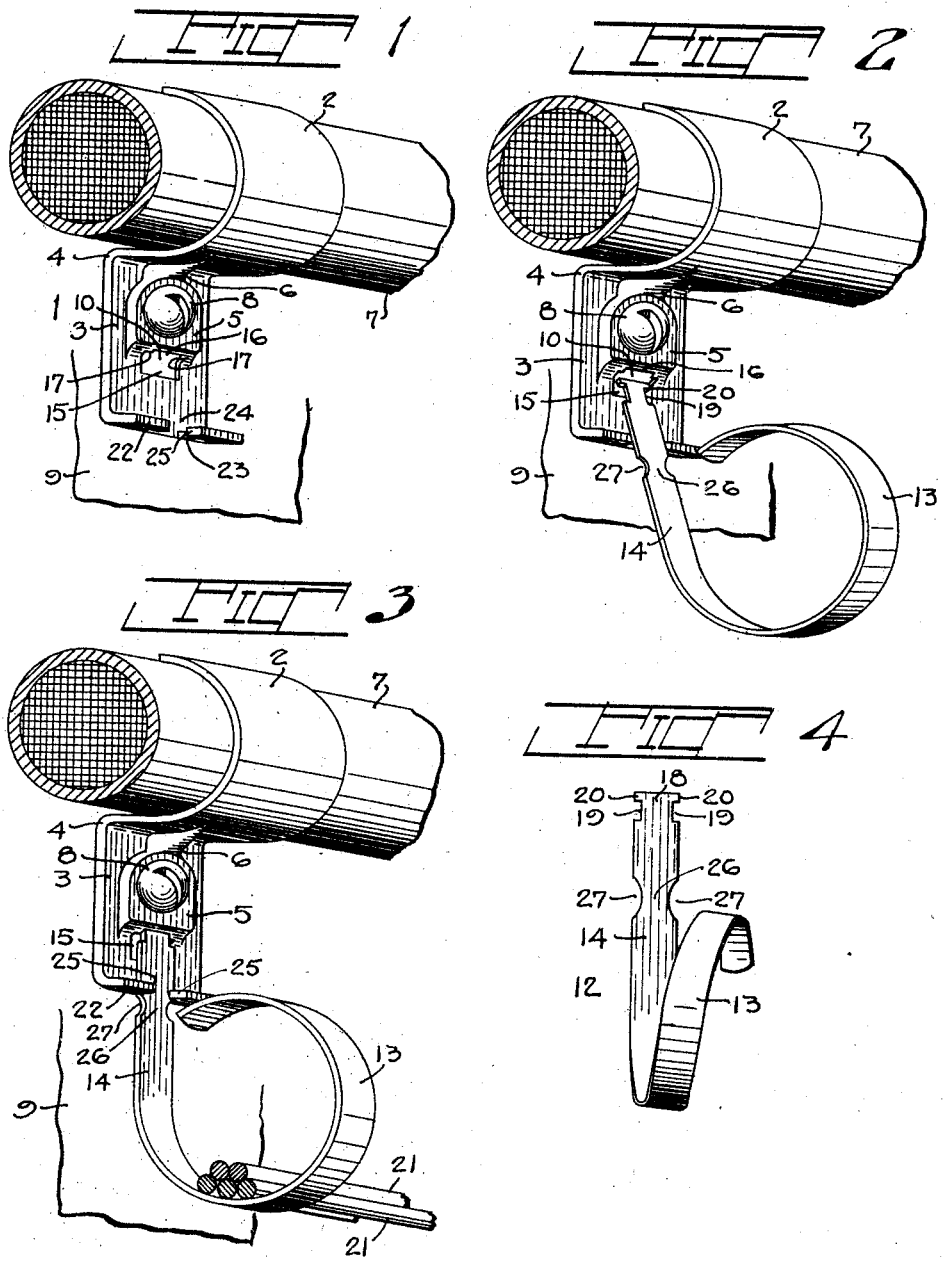

JOHN KARITZKY, OF GARWOOD, NEW JERSEY, ASSIGNOR TO HENRY B. NEWHALL, OF PLAINFIELD, NEW JERSEY, EXECUTOR OF HENRY B. NEWHALL, SR., DECEASED.

CONDUIT OR CABLE CLAMP AND BRIDLE-RING.

1,365,628.   Specification of Letters Patent.   Patented Jan. 11, 1921.

Application filed August 17, 1920. Serial No. 404,167.

*To all whom it may concern:*

Be it known that I, JOHN KARITZKY, a citizen of the United States, residing at Garwood, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and bridle ring; and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a strong cable clamp which can be made of metal of the minimum thickness and weight. My invention further relates to providing the base of the clamp with a raised boss and preferably with a strengthening shoulder extending from the boss to the hook portion and serving to transmit through the boss a large part of the strains directly to the securing screw.

My invention further relates to such a conduit or cable clamp provided with means to securely hold one end of an open or pigtail bridle ring. My invention further relates to providing the boss with such means. My invention further relates to such a conduit or cable clamp, provided with locking means to lock the end of an open pigtail bridle ring, and preferably also provided with additional locking means to positively lock the shank of the bridle ring. My invention further relates to a conduit or cable clamp formed from sheet metal of minimum thickness and having the boss and the strengthening shoulder struck up from the base.

While my conduit or cable clamp is preferably formed out of pressed sheet material as pressed steel, it may be formed from castings of malleable iron, brass, an alloy, aluminum or any other metal, or it may be made out of pressed fibrous material.

My invention further relates to certain combinations, sub-combinations, articles of manufacture, and details of construction, all of which will be more fully hereinafter described and pointed out in the claims.

In the figures in which I have shown one embodiment of my invention the same reference numerals refer to similar parts in the several figures.

Figure 1 is a perspective view of my conduit or cable clamp and of a cable which it supports;

Fig. 2 is a perspective view of the conduit or cable clamp shown in Fig. 1, with the addition of an open or pigtail bridle ring in the first position of attaching it to the clamp;

Fig. 3 is a perspective view, similar to Fig. 2 but showing the bridle ring in its operative position;

Fig. 4 is a perspective view of the preferred form of bridle ring.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention I form my conduit or cable clamp 1 with a hook portion 2 and a base 3. Preferably, though not necessarily, this conduit or cable clamp is formed of pressed sheet metal.

The weakest portion of the clamp is the meeting surface 4 where the base 3 and hook portion 2 join each other. In my invention I provide a raised boss 5 extending above the surface 3 of the base and form it preferably by stamping it up from the base. At the same time I stamp up a strengthening shoulder 6, extending from the boss to the under surface of the hook portion 2. This strengthening shoulder serves to transmit a large portion of the strains, thrown upon the clamp by the cable 7, directly to the securing screw 8 through the boss 5.

I provide the boss 5 with means to coöperate and hold one end of an open bridle ring, commonly termed a pigtail bridle ring. I have shown by way of example one form of my invention, in which the boss is provided with a slot 10.

Ordinarily the conduit or cable clamp 1 will at first, be used without the addition of a bridle ring. When, however, it is desired to increase the capacity of the installation, without going to the expense of taking down the cable 7 and installing a larger one, it is merely necessary, by my invention, to secure an open bridle ring to the clamp and string one or more runs of bridle wires. I have shown by way of example a bridle ring 12, Fig. 4, formed from flat sheet metal having an open hook 13, and a shank 14. I provide positive locking means between the end of the shank 14 of the bridle ring and the raised boss 5.

In the form of my invention which I have shown by way of example I form the slot 15 in the base 3 letting it join the slot 10 in the boss 5. This slot 10 has a reduced portion 16 forming locking shoulders 17, 17.

The end 18 of the shank 14, Fig. 4 has two slots 19, 19 formed in it preferably by punching out the metal. These two slots form locking shoulders 20, 20.

When it is desired to string runs of bridle wires 21, 21 it is merely necessary, and without loosening the securing screw 8 from the wall 9, to bring the bridle ring 12 into the position shown in Fig. 2. The slots 15 and 10 are the full width of the shank 14 of the bridle ring 12. The end 18 can therefore be readily inserted into these two slots as shown in Fig. 2. After the end 18 with its locking shoulders 20, 20 is inserted in the boss 5 the shank 14 is brought down so that it lies in a vertical plane, and against the base 3, Fig. 3. A slight downward movement on the ring 13 will draw the shank down and cause the locking shoulders 20, 20 to engage with the locking shoulders 17, 17 on the boss 5. The runs of bridle wires 21, 21 can then be strung through the bridle ring 12.

Preferably, though not necessarily, I provide the shank 14 of the conduit or cable clamp 1 with two sets of locking surfaces which positively lock the two together. These two sets of locking surfaces are preferably spaced apart.

Various forms of such locking surfaces may be employed.

In addition to the first set of locking surfaces, I preferably employ a flange 22 on the conduit or cable clamp and provide it with slots of unequal width. The slot 23 is of the same width as the shank 14. The slot 24, which is the throat of the slot 23, is of less width than the shank 14, thereby forming locking shoulders 25, 25. The shank 14 is provided with a narrow or reduced portion 26, in any suitable manner, as for example, by punching out some of the metal to form slots 27, 27.

In attaching the bridle ring 12 so that the locking shoulders 20, 20 coöperate with the locking shoulders 17, 17, in the manner previously described, the reduced portion 26 of the shank 14 is brought at the same time opposite the smaller slot 24. In moving the shank 14 into a vertical position, Fig. 3, the reduced portion 26 readily slips into the slot 24 and moves back into the slot 23 so that the shank can lie flat against the base 3. Pulling down on the shank 14 to lock the coöperating shoulders 20, 20 and 17, 17, will also, at the same time, cause the reduced portion 26 to move out of line with the small slot 24. This automatically causes the locking shoulders 25, 25 to engage over the shank 14 securely locking it with two sets of locking members so that the bridle ring 12 is firmly and rigidly held to the clamp from movement in any direction except a slight movement vertically to disengage it.

Should it ever be desired to remove the runs of bridle wires 21, 21 and the bridle ring 12, this can easily be done by manipulating the shank 14 until the reduced portion 26 is brought in line with the small slot 24. Then by pulling out on the ring 13 the reduced portion 26 is freed from the locking shoulders 25, 25, the locking shoulders 20, 20 pivoting on the shoulders 17, 17 to permit this action. Then by further manipulation the shoulders 20, 20 are freed from engagement with the locking shoulders 17, 17 when the bridle ring 12 can be removed to be used elsewhere if so desired.

It will be noted that my construction is very simple, that no tapping or screw threading of my clamp is necessary or desirable and that no screw-threads are placed upon the bridle ring. This permits me to use comparatively thin sheet metal, the boss and strengthening shoulder serving to strengthen the clamp at its weakest point.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit or cable clamp provided with a hook portion and a base, the base being provided with locking means to coöperate with the shank of an open bridle ring and prevent movement in any direction except a slight vertical movement to disengage the bridle ring from the clamp.

2. A conduit or cable clamp provided with a hook portion, and a base, the base being provided with locking means disposed in vertical alinement to lock the shank of a bridle ring.

3. A conduit or cable clamp provided with a hook portion and a base, the base being provided with locking means operated solely in a vertical direction to lock the shank of a bridle ring.

4. A conduit or cable clamp, provided with a hook portion and a base, the base being provided with a plurality of locking means to lock the shank of a bridle ring, said means operating in a vertical direction.

5. A conduit or cable clamp provided with a hook portion and a base, the base being provided with a boss raised above the surface of the base, the boss being provided with locking shoulders to coöperate with similar locking shoulders on the shank of a bridle ring.

6. A conduit or cable clamp provided with a hook portion and a base, the base being provided with a boss raised above the surface of the base, the boss being provided with locking shoulders to coöperate with similar locking shoulders on the shank of a bridle ring, the base being also provided with other locking shoulders to engage and lock the shank of the same bridle ring.

7. A conduit or cable clamp provided with a hook portion and a base, the base being provided with a boss raised above the surface of the base, the boss being provided with locking shoulders to coöperate with similar locking shoulders on the shank of a bridle ring, the base being also provided with a flange having locking shoulders to lock the shank of the same bridle ring.

8. The combination of a conduit or cable clamp provided with a hook portion and a base, the base being provided with locking means to coöperate with the shank of an open bridle ring and prevent movement in any direction except a slight vertical movement to disengage the bridle ring from the clamp, and an open bridle ring having a shank to engage with said means.

9. The combination of a conduit or cable clamp provided with a hook portion, and a base, the base being provided with locking means disposed in vertical alinement to lock the shank of a bridle ring, and an open bridle ring having a shank to engage said means.

10. A new article of manufacture comprising an open bridle ring having a shank provided with two reduced portions, forming two sets of locking shoulders.

JOHN KARITZKY.

Witnesses:
F. W. KARITZKY,
EMIL BETZ.